June 9, 1959     W. J. SNIDER     2,889,707
ANEMOMETER
Filed Oct. 28, 1955
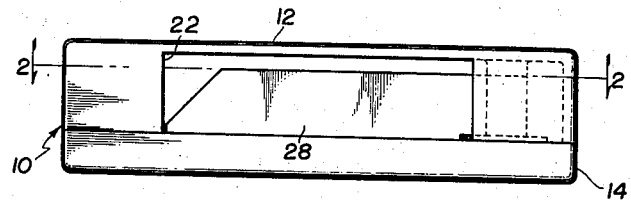
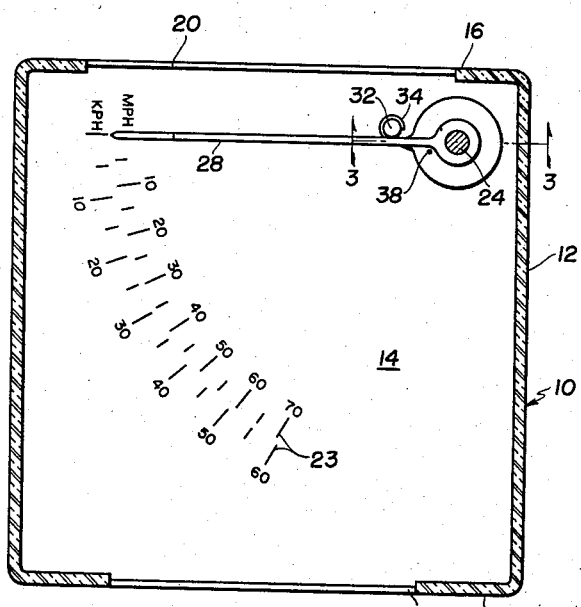
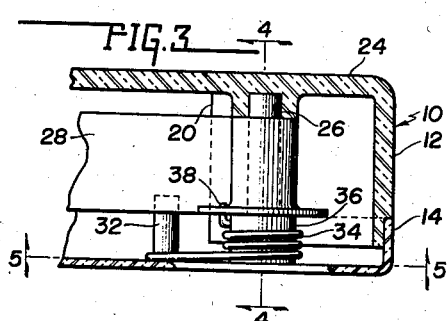
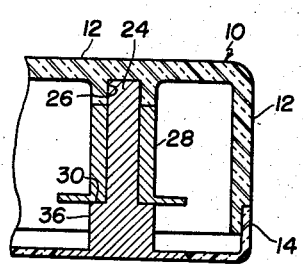
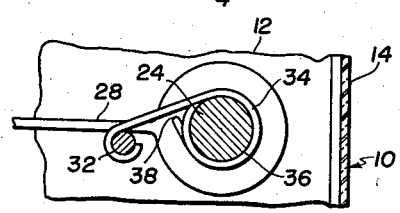
INVENTOR.
WALTER J. SNIDER
BY Lockwood, Galt, Woodard, & Smith
ATTORNEYS

# United States Patent Office 2,889,707
Patented June 9, 1959

2,889,707
ANEMOMETER
Walter J. Snider, Huntington, Ind.
Application October 28, 1955, Serial No. 543,369
1 Claim. (Cl. 73—228)

The present invention relates to an anemometer, and more particularly to a portable instrument for measuring the velocity and direction of the wind, which instrument is of such size that it may be easily carried by an individual in his shirt or coat pocket.

It is oftentimes desirable, and in some instances necessary, to know the direction and velocity of the wind. Ordinarily, this information is obtained from a meteorological station or from relatively complex and expensive instruments. Owing to the fact that it is not always possible to be in contact with a meteorological station, nor have access to such a complex instrument, it is obvious that in some instances the necessary information cannot be obtained.

It is therefore an object of this invention to provide a portable anemometer which is of such small size that it may easily be carried in a shirt pocket.

It is another object of this invention to provide a portable self-contained anemometer that needs no external connections for operation.

It is still a further object of this invention to provide an anemometer constructed essentially of durable plastic material and which is economical to manufacture and use.

It is yet another object of this invention to provide a simple and efficient portable anemometer which may be used to measure both wind direction and wind velocity.

Other objects will become apparent as the description proceeds.

To the accomplishment of the above and related objects, my invention may be embodied in the forms illustrated in the accompanying drawings, attention being called to the fact, however, that the drawings are illustrative only, and that specific change may be made in the specific constructions illustrated and described, so long as the scope of the appended claim is not violated.

In the drawings:

Fig. 1 is an end view of one embodiment of this invention;

Fig. 2 is a sectional view taken substantially on section line 2—2 of Fig. 1;

Fig. 3 is an enlarged fragmental sectional view taken substantially on section line 3—3 of Fig. 2;

Fig. 4 is a similar enlarged fragmental sectional view taken substantially on section line 4—4 of Fig. 3; and Fig. 5 is still another fragmental sectional view taken substantially along section line 5—5 of Fig. 3.

Referring to the drawings, the anemometer is composed of a plastic case or enclosure 10 which preferably is constructed of two parts, namely a cover 12 and base 14. The case 10 is substantially flat, having opposite end walls 16 and 18 which are provided with inlet and outlet openings 20 and 22, respectively. The base 14 provides the bottom for the case while the cover 12 provides the top, the two openings 20 and 22 having a width dimension substantially equal to the distance between this top and bottom, as is apparent in Fig. 1. The plastic material from which the case is made is preferably transparent, whereby a wind velocity scale 23 in suitable denominations may be inscribed on the bottom 14 as illustrated in Fig. 2. Thus, the cover 12 serves as a window through which the scale of Fig. 2 may be seen.

The inlet and outlet openings 20 and 22 provide an air or wind passage through the case 10, and it will be noted that the inlet passage 20 is of somewhat larger size than that of the outlet opening 22. This feature is significant in connection with the proper functioning of the instrument, as will become apparent from the following description.

A pivot pin 24 is fixedly seated in the base 14 to stand upright, as shown in Figs. 3 and 4. In the cover 12 immediately above the location of the pin 24 is a socket 26 which receives the upper end of the pin 24, this feature being shown in Figs. 3 and 4. By this means, the pin 24 is securely fixed in position.

Pivotally mounted on the pin 24 is a wind vane or pointer 28, the bearing portion of the pointer resting on a shoulder 30 on the pin 24. Enough clearance is provided between the socket 26 and the shoulder 30 that the pointer 28 may freely pivot or swing.

As seen in Figs. 1 and 2, the pointer 28 is relatively thin but wide, so that when it is positioned transversely of the air passage between the inlet and outlet openings 20 and 22, as illustrated in Fig. 2, it occupies a substantial portion of this passage. Thus, air blown into the inlet passage 20 will necessarily impinge the pointer 28, tending to rotate it in a counterclockwise direction, as viewed in Fig. 2.

The pointer 28 is urged in a clockwise direction, as seen in Fig. 2, against an anchor post 32 which upstands from the base 14 by means of a spiral spring 34 which encircles the base portion 36 of the pin 24. One end of the spring 34 is hooked onto the post 32, while the other end of the spring is inserted in an opening 38 in the flange portion of the pointer 28 bearing. This spring 34 is so designed that it bears a definite relationship to the wind scale 23 of Fig. 2, so that when a wind of, for example, sixty (60) miles per hour blows through the inlet opening, the pointer 28 will be swung around to the indicia on the scale which corresponds to sixty (60) miles per hour. Other wind velocities may be correspondingly read on the scale with the spring 34 yieldably resisting movement of the pointer 28.

In operation, the instrument is held in such position that the air passage provided by the inlet and outlet openings 20 and 22 is in alignment with the wind direction. The wind blowing through this air passage strikes the pointer 28 and tends to swing it in a counterclockwise direction, as viewed in Fig. 2, against the force of the spring 34. If the wind velocity is thirty (30) miles per hour, the vane will be pivoted to the indicia on the scale which corresponds to thirty (30) miles per hour. Thus, by merely noting the position of the pointer 28 on the scale, the wind velocity may be determined directly.

Wind direction may be accurately determined by swinging the instrument in a horizontal plane until a maximum reading is obtained. The axis of the air passage 20 and 22 will then be in line with the wind direction.

From the foregoing, it will be appreciated that the invention is completely portable and may be easily transported in a shirt pocket. The instrument is self-contained and does not require any external accessory devices for proper operation. It has only one moving part, which requires substantially no maintenance, and can measure wind velocity as well as determine wind direction.

Among other uses, the instrument can be used to determine the speed of vehicles, whether they be used on land, in the air, or on the water. Thus it will be appreciated that the uses of the instrument are indeed versatile.

What is claimed is:

An instrument for measuring the velocity of the wind comprising a supporting enclosure of relatively flat configuration, said enclosure being composed of a base, a cover, and end walls, said base and cover providing the upper and lower sides of said enclosure, a wind inlet opening provided in one wall and a wind outlet opening provided in the other wall thereby providing a wind passage through said enclosure, an upstanding pin on said base, a socket in said cover, the end of said pin being received by said socket, a vane pivotally mounted on said pin and extending transversely of said passage, and a spiral spring on said pin interconnected between said vane and said base urging said vane toward said inlet opening and against the force of wind blowing through said inlet opening and into said passage.

References Cited in the file of this patent

UNITED STATES PATENTS

| | | |
|---|---|---|
| 1,401,887 | Davis | Dec. 27, 1921 |
| 2,315,185 | Boyle | July 22, 1937 |
| 2,559,402 | Comstock | July 3, 1951 |